Patented Sept. 8, 1953

2,651,658

UNITED STATES PATENT OFFICE 2,651,658

PRODUCTION OF COMPOUNDS OF PHOSGENE

Lester E. Bohl, New Martinsville, W. Va., assignor, by mesne assignments, to Columbia-Southern Chemical Corporation, Pittsburgh, Pa., a corporation of Delaware No Drawing. Original application March 23, 1948, Serial No. 16,611. Divided and this application July 30, 1949, Serial No. 107,819

6 Claims. (Cl. 260—471)

This invention relates to a method of preparing carbamate esters and in particular relates to a method of preparing carbamate esters which are liquids.

In the preparation of a carbamate ester, a haloformate is reacted with an amine. During the reaction for the production of such esters, there is an evolution of hydrogen halide, such as HCl, which must be removed. Several methods have been provided to facilitate such removal.

For example, the process may be conducted in the presence of a strong basic agent, including organic bases such as pyridine, dimethyl aniline, or inorganic bases such as the oxides, hydroxides, carbonates and bicarbonates of sodium, potassium, barium, strontium, and magnesium or other alkaline earth metal or alkali metal which will react with and remove the HCl liberated.

Another method which may be used involves the use of an inert solvent which is a non-solvent for HCl, such as carbon tetrachloride or toluene, and heating at reflux temperature to drive off the HCl with the vaporizing solvent.

A difficulty involved in the preparation of the ester is that the resulting carbamate ester contains an excessive amount of combined hydrolyzable chlorine. The exact manner in which the chlorine is combined is not yet fully determined, but it appears to be present as residual chloroformate or chlorine which is directly attached to a carbonyl group. The removal of such chlorine is difficult, particularly with carbamate esters which are high boiling liquids having a boiling point greater than 150° C., especially when they are prepared with a chloroformate which also has a boiling point greater than 150° C., or which decomposes at temperatures greater than 150° C. In such cases, ordinary distillation processes are unsuitable for the removal of high boiling impurities. Washing the ester with an aqueous alkaline earth metal or alkali metal hydroxide, carbonate or bicarbonate solution, such as NaOH, will reduce the chloroformate chlorine somewhat but not enough for many purposes. Furthermore, this operation is found to be unduly slow.

The term "chloroformate chlorine" or "haloformate halogen," as used herein, means chlorine or halogen respectively, which is determined by the method of analysis set forth below and which apparently is linked directly to a carbonyl group.

For example, the chlorine present in the chloroformate

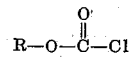

or the carbamyl chloride

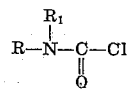

is considered to be chloroformate chlorine within the meaning of the term as herein used.

The method of determining the chloroformate chlorine present in the carbamate involves the formation of a pyridinium salt whose chlorine is ionically bound and, therefore, is available for titration as chloride ion. Fifty grams of the carbamate are placed in a 250 milliliter beaker, and 10 milliliters of a 20% pyridine solution (20 grams of pyridine mixed thoroughly with 80 milliliters of distilled water) are added. The mixture is stirred vigorously and then allowed to stand for five minutes with intermittent stirring. Fifty milliliters of distilled water are added, and then 5 milliliters of 10% ferric nitrate solution are added. (The 10% ferric nitrate solution is prepared by dissolving 100 grams of chemically pure Fe $(NO_3)_3$ in 600 milliliters of distilled water, adding 25 milliliters of chemically pure concentrated $HNO_3$ (70.0% $HNO_3$ by weight) and diluting to one liter of final solution with distilled water.) The mixture is acidified with concentrated nitric acid (70.0% $HNO_3$ by weight) and cooled to room temperature.

The solution is then titrated with 0.1 N standard silver nitrate until no more silver chloride is precipitated. An excess (2 milliliters or more) of 0.1 N standard silver nitrate is added, and the solution is stirred vigorously until the silver chloride coagulates. Then the excess silver nitrate is titrated with 0.1 N standard potassium thiocyanate until a faint rust-red color persists. The calculations are made thus:

$$\text{Percent Cl} = \frac{(\text{milliliters AgNO}_3 \times N_1) - (\text{milliliters KCNS} \times N_2) \times 0.03545 \times 100}{50}$$

where $N_1$=normality of the silver nitrate and $N_2$= normality of the potassium thiocyanate.

The present invention provides a novel method for preparing N-substituted carbamate esters, and for removing chloroformate chlorine from the carbamate esters which is more rapid and more effective than previously used processes. It has been found, according to this invention, that such chlorine may be removed by contacting the carbamate ester with ammonia after its formation and after the chloroformate has been substantially completely consumed. Thus, in performance of this invention, a carbamate ester is prepared, for example, by reaction of a chloroformate with an amine, usually in the presence of a strong base, as previously noted. The amount of base or alkaline agent added is at least sufficient in theory to react with all or substantially all of the HCl which may theoretically evolve. After the reaction is largely complete, the resultant carbamate ester contains a residual quantity, for example, from 1 to 5 percent or even less by weight of chloroformate chlorine.

Where the reaction is conducted without the strong base, as for example by the use of the nonsolvent as above described, reflux is continued until the reaction is largely completed and then is treated as herein contemplated.

The term "ammonia," as herein used in the specification and in the claims, is intended to mean ammonia ($NH_3$) and ammonium compounds such as ammonium hydroxide, ammonium carbonate, ammonium bicarbonate, etc., which will liberate ammonia for reaction with HCl.

A typical method of performing the invention involves its application with respect to the production of diethylene glycol bis(di-n-butyl carbamate). This may be accomplished by the reaction of diethylene glycol bis(chloroformate) with di-n-butylamine in the presence of sodium bicarbonate while maintaining the reaction mixture at a temperature substantially below room temperature, usually around 0° to 5° C.

In this typical reaction between the chloroformate and the amine, the reaction may be carried out to the point where the chloroformate chlorine content is about 1 to 5% by weight, and further may be treated with NaOH or other alkali metal or alkaline earth metal oxide, hydroxide, carbonate or bicarbonate to reduce the chloroformate to a lower value, for example, 1 to 2% or below. Then, in accordance with this invention, ammonia, usually in the form of aqueous ammonium hydroxide, bicarbonate or carbonate and in amount several times the theoretical equivalent of the chlorine concentration, is added to the mixture to reduce the chlorine concentration below about 0.1% by weight and preferably below 0.005%.

The invention may be applied to numerous other procedures for producing the carbamate esters. As an illustration, it is applicable to processes wherein the chloroformate is added to a mixture of the basic re-agent and the amine, or where the amine is added to a mixture of the chloroformate and basic re-agent.

The invention may be applied to the production of numerous carbamates. It is particularly concerned with the high boiling esters which are prepared by reacting a polychloroformate, such as a bischloroformate of a dihydric alcohol or dihydroxy compound, with an amine.

In the production of the carbamates as herein contemplated, haloformates or polyhaloformates are reacted with an equivalent amount of an amine, and the remaining haloformate halogen removed in accordance with this invention. The carbamates which may be prepared are of the general structure:

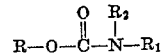

wherein $R_1$ or $R_2$ are radicals of a primary or secondary amine,

$R_1$ or $R_2$ may be hydrogen, but either $R_1$ or $R_2$ or both are alkyl, aryl, alicyclic, aralkyl monovalent radicals, usually containing 1 to 18 carbon atoms, the nitrogen being linked directly to the carbon. Primary amines such as methyl, ethyl, n-butyl, allyl, vinyl, etc., amine, or secondary amines such as dimethyl, diethyl, phenylethyl, methyl-ethyl, dibutyl, etc., amine may be used. Also, a diamine may be reacted with a chloroformate linkage, as previously defined.

Haloformates of the following hydroxy compounds are suitable for the reaction: methyl, ethyl, propyl, isopropyl, butyl or isobutyl alcohols, or other straight or branched chain paraffin alcohols including those of higher molecular weights such as stearyl, dodecyl, cetyl, and melissyl alcohols, or the aromatic alcohols such as benzyl, phenylethyl etc. alcohols, or unsaturated alcohols such as allyl, methallyl, crotyl, isocrotyl, cinnamyl, propargyl, tiglyl, or methyl vinyl carbinyl alcohols, citronellol, geraniol, and the higher molecular alcohols including oleyl and linoleyl alcohols; also substituted alcohols such as 2-chloroallyl, 2-bromoallyl, or chlorocrotyl alcohol, 3-chlorobutene 2-ol-1, or other halogen substituted alcohols.

The polyhaloformates of the following hydroxy compounds are suitable for the reaction: glycols or polyglycols such as the alkylene glycols, for example, ethylene glycol, trimethylene glycol, pentamethylene glycol, tetramethylene glycol, propylene glycol, etc., or the polyhydroxy ethers, polyglycols such as the di-, tri-, and tetra-ethylene glycols and the di-, tri-, and tetra-propylene glycols, polybutylene glycols, 1,2-dihydroxy-4-ethoxy butane, α,α-dihydroxy diphenyl ether, or other aromatic dihydroxy compounds such as resorcinol, phthalyl alcohol, etc.

Other di- or trichloroformates or other polychloroformates, such as pyrogallol trichloroformate, may be reacted with methyl, ethyl, allyl, propyl, methallyl, etc. amines to form esters which may be resinous in nature if polyhydric alcohols are utilized.

In addition, a carbamate may be prepared by reaction of carbamyl halide, such as carbamyl chloride, with a monohydric alcohol, such as ethyl alcohol, and residual hydrolyzable or chloroformate chlorine removed as herein contemplated. Typical of these carbamates are methyl, ethyl, vinyl, allyl, etc., carbamates of the monohydric alcohols disclosed above.

The following is an illustrative example of the invention:

*Example*

Into a 4-liter beaker was placed 551.3 grams of di-n-butylamine and 360 grams of sodium bicarbonate. Enough ice was added to maintain the temperature below 10° C. With vigorous stirring, 494.3 grams of diethylene glycol bis-(chloroformate) was slowly added. Ice was added to the mixture to keep the temperature below 10° C. After the addition of the chloroformate was complete, the mixture was allowed to stand, with stirring, for one hour. At the end of this period, carbon dioxide continued to be evolved and approximately 100 grams additional NaHCO3 was added and the mixture was allowed to stand over night. The reaction mixture was transferred to a separatory funnel and 1 liter of ethylene dichloride was added. This mixture was washed with water. The ethylene dichloride was distilled off and the mixture was heated to 150° C. at an absolute pressure of 3 millimeters of mercury. The product contained approximately 0.14% by weight of chloroformate chlorine. Then, 20 cc. of concentrated aqueous ammonium hydroxide solution containing 28% by weight of NH4OH (approximately 10 times the theoretical equivalent of chlorine) was added and the mixture was stirred for 15 minutes. The chloroformate chlorine, after the NH4OH treatment, was less than 0.001% by weight.

Although the present invention has been described with reference to certain examples of compounds in general groups, it is not intended that such compounds alone shall be regarded as limited upon the scope of the invention except so far as included in the accompanying claims.

This application is a division of my application filed March 23, 1948, Serial No. 16,611, for Production of Compounds of Phosgene, now Patent No. 2,517,965.

What is claimed:

1. In the process of preparing a carbamate ester by reacting a haloformate with an amine whereby the carbamate ester containing haloformate halogen as an impurity is obtained, the improvement which comprises removing haloformate halogen from the carbamate ester by contacting the ester with a compound of the group consisting of ammonia and ammonium compounds which will liberate ammonia for reaction with HCl, and removing the resultant halide which is formed.

2. In the process of preparing a carbamate ester by reacting a chloroformate with an amine whereby the carbamate ester containing chloroformate chlorine as an impurity is obtained, the improvement which comprises removing chloroformate chlorine from the carbamate by contacting the ester with a compound of the group consisting of ammonia and ammonium compounds which will liberate ammonia for reaction with HCl, and removing the resultant halide which is formed.

3. In the process of preparing a carbamate ester by reacting a chloroformate with an amine whereby the carbamate ester containing chloroformate chlorine as an impurity is obtained, the improvement which comprises removing chloroformate chlorine from the carbamate ester by contacting the ester with ammonium hydroxide and removing the resultant chloride which is formed.

4. A method of preparing a carbamate ester which comprises reacting a chloroformate with an amine to cause formation of said carbamate ester and then removing residual chloroformate chlorine in said carbamate ester by mixing the carbamate ester with a compound of the group consisting of ammonia and ammonium compounds which will liberate ammonia for reaction with HCl, said compound to react with the chloroformate chlorine.

5. In the process of preparing a carbamate ester by reacting a haloformate with an amine whereby the carbamate ester containing haloformate halogen as an impurity is obtained, the improvement which comprises partially removing the haloformate halogen by treating the carbamate ester with a compound of the group consisting of alkali metal oxides, hydroxides, carbonates and bicarbonates and alkaline earth metal oxides, hydroxides, carbonates and bicarbonates and further removing the haloformate halogen from the carbamate ester by contacting the ester with a compound selected from a group consisting of ammonia and ammonium compounds which will liberate ammonia for reaction with HCl and removing the resultant halide which is formed.

6. In the process of preparing a carbamate ester by reacting a haloformate with an amine whereby the carbamate ester containing haloformate halogen as an impurity is obtained, the improvement which comprises partially reducing the haloformate halogen content of the carbamate ester by treating the carbamate ester with a compound of the group consisting of alkali metal oxides, hydroxides, carbonates and bicarbonates and alkaline earth metal oxides, hydroxides, carbonates and bicarbonates and further reducing the haloformate halogen content of the carbamate ester to a concentration of less than .1% by weight of the carbamate ester by contacting the ester with a compound selected from a group consisting of ammonia and ammonium compounds which will liberate ammonia for reaction with HCl and removing the resultant halide which is formed.

LESTER E. BOHL.

References Cited in the file of this patent

UNITED STATES PATENTS

| Number | Name | Date |
| --- | --- | --- |
| 2,261,169 | Lott | Nov. 4, 1941 |
| 2,395,336 | MacMullen | Feb. 19, 1946 |
| 2,433,595 | Campbell | Dec. 30, 1947 |

FOREIGN PATENTS

| Number | Country | Date |
| --- | --- | --- |
| 62,684 | Switzerland | Dec. 23, 1912 |
| 254,472 | Germany | Feb. 29, 1912 |
| 378,390 | Great Britain | Aug. 8, 1932 |